(12) United States Patent
   Goodger

(10) Patent No.: US 9,946,090 B2
(45) Date of Patent: Apr. 17, 2018

(54) CUSHIONED EYEGLASS FRAME NOSE SUPPORT

(71) Applicant: John Goodger, Clermont, FL (US)

(72) Inventor: John Goodger, Clermont, FL (US)

( * ) Notice: Subject to any disclaimer, the term of this patent is extended or adjusted under 35 U.S.C. 154(b) by 0 days.

(21) Appl. No.: 15/013,598

(22) Filed: Feb. 2, 2016

(65) Prior Publication Data

US 2017/0219844 A1    Aug. 3, 2017

(51) Int. Cl.
   *G02C 5/12*    (2006.01)
   *G02C 5/02*    (2006.01)

(52) U.S. Cl.
   CPC .................................... *G02C 5/126* (2013.01)

(58) Field of Classification Search
   CPC . G02C 5/126; G02C 5/12; G02C 5/02; G02C 5/10; G02C 1/00; G02C 1/02; G02C 1/04; G02C 1/06; G02C 5/00; G02C 5/001; G02C 5/008; G02C 5/2272; G02C 9/00; G02C 9/04; G02C 3/003; A61F 9/025; A61F 9/026
   USPC ... 359/41, 44, 47, 57, 62, 63, 106, 107, 110, 359/136, 138, 156–158; 351/41, 44, 47, 351/57, 62, 63, 106, 107, 110, 136, 138, 351/156–158; 428/40.1
   See application file for complete search history.

(56) References Cited

U.S. PATENT DOCUMENTS

| 4,070,104 | A |   | 1/1978 | Rice |   |
|---|---|---|---|---|---|
| 4,953,967 | A |   | 9/1990 | Somerville |   |
| 5,092,666 | A |   | 3/1992 | Cress |   |
| 5,196,871 | A |   | 3/1993 | Tom |   |
| 5,467,205 | A | * | 11/1995 | Kuba | G02B 27/017 348/E13.04 |
| 5,790,230 | A | * | 8/1998 | Sved | A61F 9/025 351/110 |
| 6,386,703 | B1 | * | 5/2002 | Huang | G02C 9/00 351/47 |
| 7,140,729 | B2 | * | 11/2006 | Resler | G02C 3/003 351/156 |
| 7,798,636 | B2 |   | 9/2010 | De La Renaudiere |   |

* cited by examiner

*Primary Examiner* — Mustak Choudhury
(74) *Attorney, Agent, or Firm* — Alfred M. Walker

(57) ABSTRACT

A flexible foam nose cushion block attached on top of the nose area of an eyeglass frame takes stress off of the nose of the wearer of the eyeglasses. It replaces the traditional eyeglass nose supports, thereby releasing stress on the nose. The cushion sits atop the nose, as opposed to the side of the nose like ordinary eyeglass nose supports, thus distributing the weight of the eyeglasses, increasing the comfort, and eliminating the typical indentation marks left by traditional eyeglasses. The flexible nose cushion is attached to a horizontally extending supporting cross member between the two eyeglass lens frame members at or near the top of the lenses.

15 Claims, 3 Drawing Sheets

CUSHIONED EYEGLASS FRAME NOSE SUPPORT

FIELD OF THE INVENTION

The present invention is a foam plastic material support used as a substitute for the traditional nose supports of a pair of eyeglasses, thereby relieving high stress points on the nose.

BACKGROUND OF THE INVENTION

The prior art includes U.S. Pat. No. 4,070,104 of Rice, U.S. Pat. No. 5,196,871 of Tom and U.S. Pat. No. 4,953,967 of Somerville, which each incorporates standard side nose supports that sit on the side of the nose and do not properly distribute the weight of the glasses downward on the wearer's nose. U.S. Pat. No. 7,798,636 B2 of De La Renaudiere discloses a cushioned nose pad for a pair of eyeglasses. However, the cushioned nose pad of De La Renaudiere '636 only discloses a foam "layer" 3 over a semi-rigid plastic support member 5, that constitutes the nose support 10 shown in De La Raudiere '636. As noted in De La Raudiere '636, the support must be rigid enough to accommodate fasteners, such as threaded screws, there through. In other words, De La Raudiere '636's foam is only a small outer part of what De La Raudiere '636 describes as the nose support 10.

Additionally, the U.S. Pat. No. 7,140,729 of Resler et al. for children's sunglasses uses a nose bridge pad as well as temple pads to support low cost disposable glasses on infants or small children. The nose pad engages the nose from the front as a flat nose bridge on the frame pulls the glasses against the face by using flexible side straps which are attached at the rear using hook and loop fasteners.

The U.S. Pat. No. 5,092,666 of Cress is a method of conformably fitting eyeglass frames using multiple elastomeric pads wherever the frame contacts the user's face. The pad materials are preferably a specific silicone elastomer. The pads, including a nose pad are multi-layered with at least one layer being moldable to facial contours by gentle pressing and then curing in a separate step.

OBJECTS OF THE INVENTION

It is an object of the present invention to provide a full, true cushioning support on top of the nose to prevent irritation from traditional nose side supports on the sides of the nose of the wearer of the eyeglasses.

Other objects will become apparent from the disclosure of the present invention and drawings herein.

SUMMARY OF THE INVENTION

The present invention is a cushion attachable to an eyeglass frame, to take stress off of the nose of the wearer of the eyeglasses.

A foam plastic material support is used instead of the traditional nose supports of a pair of eyeglasses, thereby relieving stress on the nose. The configuration and design sits atop the nose, as opposed to the side of the nose like ordinary eyeglass nose supports, thus distributing the weight of the eyeglasses over a larger skin area, increasing the comfort and reducing the typical indentation marks left by traditional eyeglasses.

The eyeglass frame nose cushion has a configuration of a flexible support cushion block, to prevent irritation to the sides of the nose inflicted by standard nose supports. In order to disperse the supporting force, a separate, built-in horizontally extending nose support sits atop the eyeglasses to distribute the weight away from the sides of the nose. The invention may be built and installed on the cross member between the two eyeglass lens frame members, above the location of the traditional nose supports.

The nose cushion, a soft foam nose support, distributes the weight of the glasses making it more comfortable, and it does not leave any marks on the skin.

The foam member is a block of foam that is inserted around and below the cross member between the two eyeglass lens frames.

DESCRIPTION OF THE DRAWINGS

The present invention can be seen by the following drawings, which are illustrative only and not meant to be limiting, other than by the scope of the invention noted in the claims, in which:

DETAILED DESCRIPTION OF THE EMBODIMENTS

As shown in drawing FIGS. 1-7, a foam plastic material support replaces the traditional nose supports of a pair of eyeglasses, thereby releasing stress on the nose. The configuration and design sits atop the nose, as opposed to the side of the nose like ordinary eyeglass nose supports, thus dispersing the weight of the eyeglasses, increasing the comfort and reducing the typical indentation marks left by traditional eyeglasses.

The eyeglass frame nose cushion has a configuration of a flexible support cushion block, to prevent irritation to the sides of the nose inflicted by standard nose supports. In order to disperse the force of the nose supports, a separate horizontally extending nose support sits atop the eyeglasses, above the location of the traditional side nose supports, to distribute the weight away from the side directions. The invention is built and installed on the cross member between the two eyeglass lens frame members.

Figure 1:
FIG. 1 is a perspective view example of a prior art eyeglass frame shown being held by the hands of the user, with the user trying to release pressure on the sides of the nose.

FIG. 1 shows a prior art eyeglass frame 1 being held by the hands of the user, with the user trying to relieve the pressure indentations on the sides of the nose.

Figure 2:
FIG. 2 is a perspective view showing the eyeglasses with the foam support sitting comfortably on the nose of the eyeglass wearer.

FIG. 2 shows the eyeglasses 10 of this invention with the foam support cushion 14, sitting comfortably on the nose of the eyeglass wearer behind cross member 12 having enlarged area 12a, to which is attached foam cushion support 14.

Figure 3:
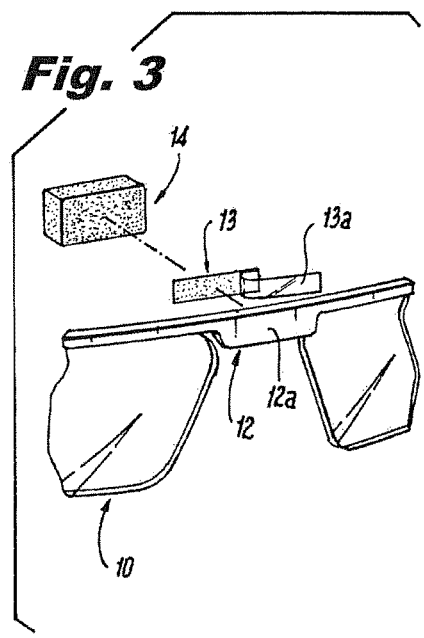
FIG. 3 is a close up detail view of the eyeglass foam support, wherein the arrow indicates the exploded repositioning of the foam block into the area cross member between the two eyeglass lens frames.

FIG. 3 shows a detail of the eyeglass foam support or block 14, wherein the arrow indicates the exploded repositioning of the foam block into the area cross member 12 between the two eyeglass lens frames. Attachment of foam block cushion 14 to cross member 12 can be by adhesive layer 13 having release liner 13a.

Figure 4:
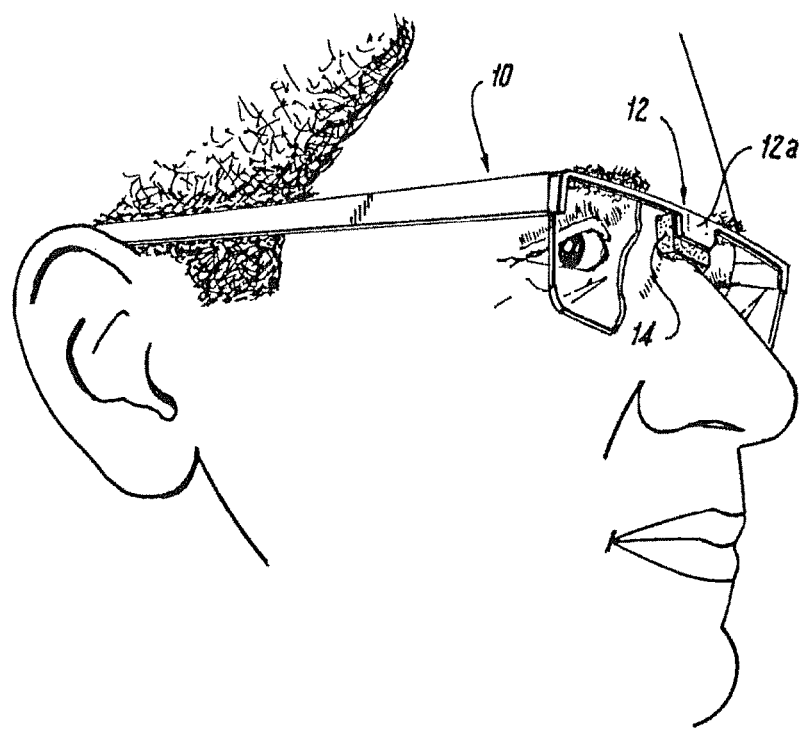
FIG. 4 is a close up side perspective view showing the eyeglass frame with the foam block cushion of the present invention being worn on the nose of the wearer, wherein the perspective view is from below.

FIG. 4 shows from below the eyeglass frame 10 with the foam block cushion 14 of the present invention being worn on the nose of the wearer, wherein foam block cushion 14 is attached to enlarged area 12a of cross member 12, so that foam block cushion 14 is positioned behind cross member 12.

Figure 5:
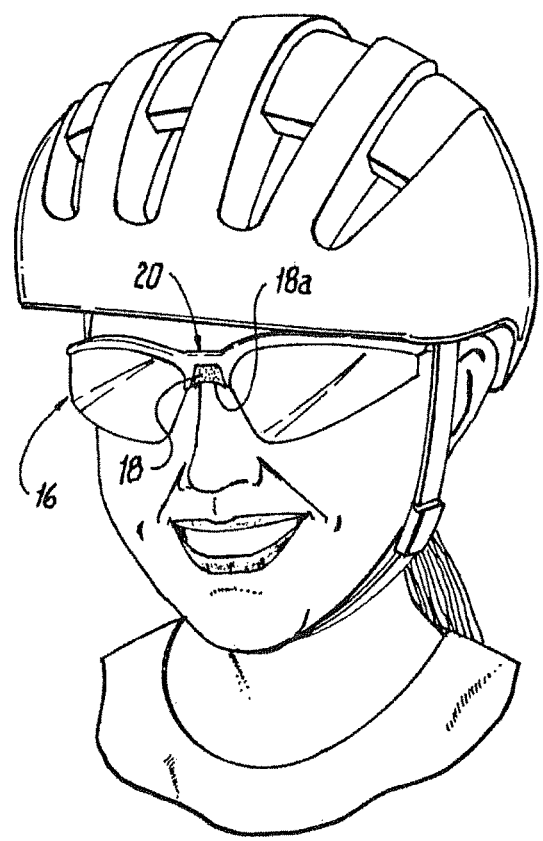
FIG. 5 is a view of an alternate embodiment for racer-type glasses worn with a bicycle helmet.

FIG. 5 shows an alternate embodiment for racer-type eye glasses 16 worn with a bicycle helmet. Here foam block cushion 18 has a different curved shaped bottom surface 18a, which is curved to rest more comfortably on the nose of the wearer. Foam block cushion 18 is compatible with eyeglass frame 16 and cross member 20.

Figure 6:
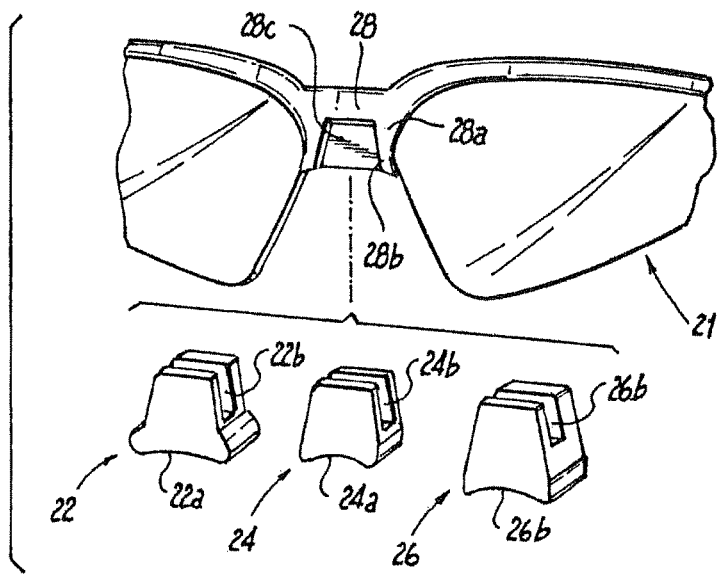
FIG. 6 is a close up detail view showing various insertable blocks which are inserted from below into the bottom of the cross member separating the frame lens supports, wherein the blocks have a cutout recess which is engaged with features of the cross member.

FIG. 6 is shows various eyeglass frame 21 having one or more separate insertable foam block cushions 22, 24, 26, each provided with bottom curved nose accommodating surfaces 22a, 24a, 26a, and each also provided with different contoured and recess features 22b, 24b and 26b, which are inserted from below into the recessed downwardly protruding area 28c, extending up from bottom 28b of enlarged portion 28a, of cross member 28, of eyeglass frame 21. Each of these blocks 22, 24, 26 has a respective cutout recess 22b, 24b, 26b which is insertable from below cross member 28 into the recessed downwardly protruding area 28c of cross member 28 of eyeglass frame 21. For example, block 22 is wider and fits closer to lenses. Block 24 is more narrow and has a concave bottom contour. Block 26 is taller and concave on its bottom surface thereby slightly raising the eyeglass frame atop the nose. It is noted that eyeglass frame 21 can be provided with one foam cushion block, or a set of a plurality of foam cushion blocks.

Figure 7:
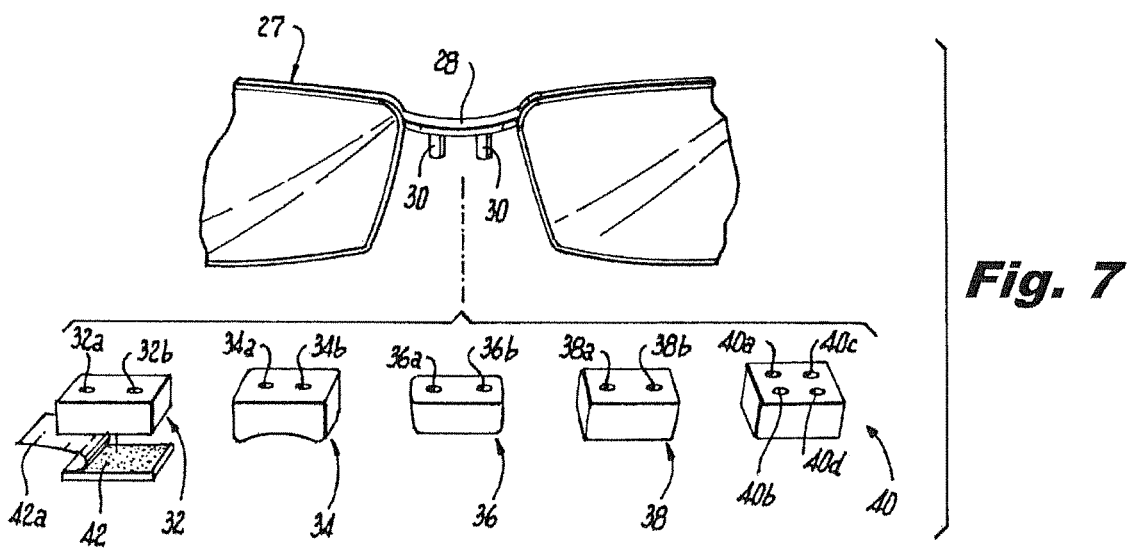
FIG. 7 shows an alternate embodiment for various blocks which are attached to a pair of eyeglasses, wherein the foam blocks have a pair of holes which contain recesses into which protrusions from the cross member of the eyeglass lens frames are inserted. The eyeglass frame can be provided with multiple blocks, each having different depths of the holes, to accommodate positions closer or farther from said nose surface.

FIG. 7 shows an alternate embodiment for eyeglass frame 27 having various foam blocks 32, 34, 36, 38, 40 which are used on a pair of eyeglasses, wherein the foam blocks 32, 34, 36, 38, 40 each have a pair or more of holes 32a, 32b, 34a, 34b, 36a, 36b, or 38a, 38b, or else, multi-paired holes 40a, 40b, 40c, 40d to receive protrusions 30 attached downward from cross member 28. Note that foam block cushion 32 is shown, for example, having a provision to receive a replaceable surface pad layer 42 with adhesive behind a removable release liner 42a. Similar adhesive layers can be provided for foam cushion blocks 34, 36, 38 or 40. Each foam cushion block may have different ergonomic nose accommodating features. For example, cushion 34 has a concave bottom surface, Cushion 36 is more narrow. Cushion 38 is higher, and cushion 40 has two sets of attachment holes 40a, 40b and 40c, 40d, to accommodate positions of protrusions 30 closer or farther from the nose surface. It is noted that eyeglass frame 28 can be provided with one foam cushion block, or a set of a plurality of foam cushion blocks.

Additionally, the eyeglass frame can be provided with multiple nose foam block cushions blocks 32, 34, 36, 38, 40, each having different depths of the holes 32a, 32b, 34a, 34b, 36a, 36b, or 38a, 38b, 40a, 40b, 40c, 40d, to accommodate positions of the nose foam block cushions closer or farther from the nose surface of the wearer.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:
1. An eyeglass frame comprising:
a pair of lenses joined by a cross member;
said cross member having at least one descending enlarged portion;
said at least one descending enlarged portion having a surface area facing a wearer of said eyeglass frame;
a replaceable cushion block of soft cushion material mounted on said surface area forming a nose cushion adapted to sit atop the nose of the wearer for support of said frame on said nose of said wearer, and not relying on providing support on sides of said nose and to the forehead, to prevent irritation of the nose of the wearer;
said replaceable cushion block having a bottom surface conformable to the curvature of the nose of the wearer; and
having additional replaceable cushion blocks of soft cushion material having differently shaped external surfaces to allow accommodation to curved nose surfaces of different users of said eyeglass frame.

2. The eyeglass frame of claim 1 in which said replaceable cushion block of soft cushion material is retained on said surface area of said enlarged portion of said cross member by an adhesive layer.

3. The eyeglass frame of claim 2 in which said replaceable cushion block is provided with adhesive layer with a removable release liner.

4. The eyeglass frame of claim 3 in which said replaceable cushion block has an external curved surface curved to rest more comfortably on said nose of the wearer.

5. The eyeglass frame of claim 1 further comprising a set of additional replaceable cushion blocks of soft cushion material to provide replacement cushion blocks of soft cushion material after a used replaceable cushion block of soft cushion material is worn out.

6. An eyeglass frame comprising:
a pair of lenses joined by a cross member;
said cross member having a pair of descending members supporting a descending enlarged portion;
said descending enlarged portion having a solid recessed area in a section of the descending enlarged portion facing a nose bridge of a wearer extending upwardly from a substantially straight bottom edge of said solid recessed area;
a replaceable cushion block of soft cushion material having an opening structured to slide onto said recessed area from said substantially straight bottom edge, said replaceable cushion block of soft cushion material having an external surface oriented to face said nose bridge and curved to rest more comfortably atop the nose of the wearer and not relying on providing support from sides of said nose and from the forehead; and having additional replaceable cushion blocks of soft cushion material having differently shaped external surfaces to allow accommodation to curved nose surfaces of different users of said eyeglass frame.

7. The eyeglass frame of claim 6 further comprising a set of additional replaceable cushion blocks if said replaceable cushion block of soft cushion material is worn out.

8. An eyeglass frame comprising:
a pair of lenses joined by a rod-like cross member extending between points adjacent upper edges of said lenses, said cross member not having an enlarged portion;
said cross member having a pair of downwardly directed, spaced protrusions;
a plurality of replaceable cushion blocks of soft cushion material each having a pair of holes to receive said protrusions for mounting each of said replaceable cushion blocks on said cross member;
each replaceable cushion block having a differently shaped curved surface for resting atop a nose surface of a wearer and not relying on providing support by sides of said nose, and by the forehead, whereas a wearer is able to select a replaceable cushion block which more clearly matches the curved nose surface of his or her nose; and
having additional replaceable cushion blocks of soft cushion material having differently shaped external surfaces to allow accommodation to curved nose surfaces of different users of said eyeglass frame.

9. The eyeglass frame of claim 8 in which each curved surface has a replaceable surface pad layer attached by an adhesive.

10. The eyeglass frame of claim 9 in which each replaceable surface pad layer is provided with a removable release liner.

11. The eyeglass frame of claim 8 in which some replaceable cushion blocks of soft cushion material have different heights to accommodate positions closer or farther from said nose surface.

12. The eye glass frame of claim 11 in which each curved surface has a replaceable surface pad layer attached by an adhesive.

13. The eyeglass frame of claim 8 having a replaceable cushion block of soft cushion material with a second set of holes with different depths to accommodate positions closer or farther from said nose surface.

14. The eyeglass frame of claim 13 in which each curved surface has a replaceable surface pad layer attached by an adhesive.

15. The eyeglass frame of claim 8 further comprising a set of additional replaceable cushion blocks of soft cushion material to provide replacements cushion blocks of soft cushion material after a used replacement cushion block of soft cushion material is worn out.

\* \* \* \* \*